AUDIO SYSTEM FOR INSTRUCTING AN OPERATOR IN THE PERFORMANCE OF CONTINUITY TESTING

Filed March 2, 1961

INVENTORS
Thomas J. Griffin, Jr.
Charles M. Beatenbough,
BY R. P. Miller
ATTORNEY 3,222,597
Patented Dec. 7, 1965

3,222,597

AUDIO SYSTEM FOR INSTRUCTING AN OPERATOR IN THE PERFORMANCE OF CONTINUITY TESTING

Charles M. Beatenbough, Burlington, and Thomas J. Griffin, Jr., Graham, N.C.; said Beatenbough assignor to Bell Telephone Laboratories, Incorporated, New York, N.Y., a corporation of New York, and said Griffin assignor to Western Electric Company, Incorporated, New York, N.Y., a corporation of New York Filed Mar. 2, 1961, Ser. No. 92,994
2 Claims. (Cl. 324—73)

This invention relates to an apparatus for presenting audible instructions to an operator, and more particularly to an apparatus for audibly presenting stey-by-step testing instructions to an operator and automatically controlling equipment functions in synchronism with an execution of the instructions and results thereof.

In performing complex manufacturing operations, such as assembling, wiring, or testing, it has been customary to prepare detailed drawings and supplementary written instructions showing all the assembling, wiring, or testing operations. Obviously, such complex manufacturing operations result in voluminous drawings and supplementary instructions that require constant reference and are very difficult to interpret. Such interpretation and constant reference to both the drawings and written instructions are very time consuming and are subject to frequent errors.

Accordingly, it is a primary object of the present invention to provide a simple apparatus for assisting employees in performing complex manufacturing operations.

Another object of the present invention is the provision of an apparatus for audibly instructing an operator.

A further object of this invention resides in an apparatus for sequentially generating a series of audible testing instructions and controling the subsequent generation of each testing instruction in accordance with test results ascertained after each test.

An additional object of the invention is to provide an apparatus for audibly presenting step-by-step testing instructions by a tape playback machine to an operator and automatically controlling the playback machine in synchronism with an execution of the testing instructions and the testing results to apprise the operator of the testing results.

With these and other objects in view the present invention contemplates an apparatus for audibly instructing an operator in performing complex testing operations with a tape playback machine which is synchronized with each operation. First, the complex testing operations for a particular unit to be tested are broken down into a convenient sequence of simple testing steps or operations. Corresponding to each operation, an audible instruction signal of the manner in which to perform the particular operation, a control signal, and an audible positive test signals are successively recorded on a magnetic tape. Then the magnetic tape is played back on a tape machine to audibly instruct the operator, informing him how to perform the particular testing step or operation in the sequence of operations. The tape machine is then automatically deenergized by the control signal corresponding to the particular testing step or operation to give the operator the time required to perform the just previously heard testing instrucion on the test unit. After the operator has performed the particular testing step or operation in accordance with the audible instruction, the tape machine is automatically maintained deenergized if a negative test results from the testing operation. This apprises the operator of an unsatisfactory unit. On the other hand, if the unit under test is acceptable, the tape machine is automatically energized to produce the audible continuity signal corresponding to the just previously performed testing operation and to advance the tape to produce the next audible instruction corresponding to the next testing step or operation. The tape machine is controlled in accordance with the results of this next testing operation in the same manner it was controlled for the previous testing operation. This procedure is repeated until each testing operation of the desierd sequence of testing operations is performed to completely check the unit under test.

Other objects and advantages of the present invention will be apparent from the following detailed description when considered in conjunction with the accompanying drawings, wherein.

Figures 1, 2:
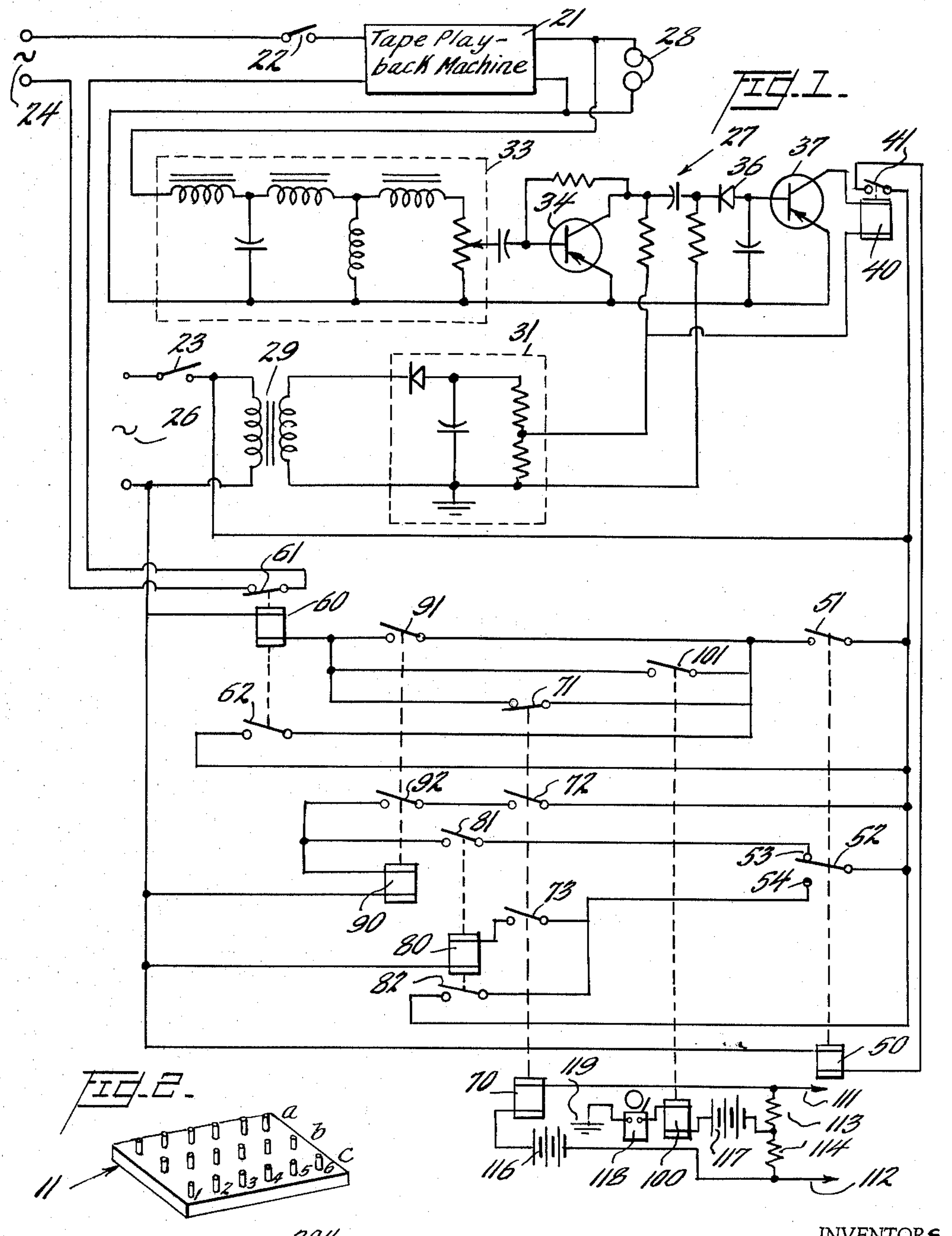
FIG. 1 illustrates a system, embodying the principles of the invention, for audibly instructing an operator in sequentially testing an electrical unit.
FIG. 2 illustrates an electrical unit to be tested by the system iof FIG. 1.

Referring to FIG. 2, there is shown an electrical unit, designated generally by the numeral 11, having a plurality of terminals to be tested for continuity, grounds, or the like. The particular test to be performed on unit 11 is broken down into a convenient sequence of simple testing steps or operations. Corresponding to each operation, an audible instruction, represented by signal 12 (FIG. 3) is recorded on a magnetic tape 13 and defined by lines 201 and 202. Similarly, corresponding to each instruction signal, a control or stop signal, represented by signal 14 of an inaudible frequency such as 20 c.p.s. or the like, is recorded adjacent each instruction signal on magnetic tape 13 and is defined by lines 202 and 203. If desired, signal 14 could also be of an audible frequency. Overlapping a portion of each control or stop signal, such as signal 14, there is recorded a continuity signal, such as signal 15, defined by lines 204 and 205, of an audible frequency such as 800 c.p.s. or the like. Although such overlapping is not necessary to the operation of the apparatus of FIGS. 1 and 2, and 3, it permits a greater number of signals to be recorded on tape 13 than would be possible without such overlapping. Adjacent to the continuity signal 15, a second instruction represented by signal 16 is recorded, which corresponds to the next testing step or operation of the sequence of desired testing operations. In summary, a successive instruction, control and continuity signal is recorded on tape 13 for each testing step or operation to be performed on unit 11.

After the appropriate signals for a particular unit to be tested, such as unit 11, are recorded on tape 13, the tape is positioned within a conventional tape machine adapted to operate on playback and designated by numeral 21 (FIG. 1). To initiate the sequence of desired testing steps or operations, both switches 22 and 23 are closed to connect alternating current sources 24 and 26, respectively, to the tape machine 21 and relay amplifier, generally designated by the numeral 27. Closure of switch 22 energizes the playback machine 21 to advance the tape 13 in the direction of travel depicted in FIG. 3, past conventional pickup heads, not shown, of machine 21. As the instruction signal 12 passes the pickup heads, a corresponding audible instruction is produced, which is heard by the operator through an electrical signal-to-sound transducer, such as earphones 28 which are coupled to the output of the tape machine 21.

After the back edge, represented by line 202 of instruction signal 12 completely passes the pickup heads, the corresponding control signal 14 on tape 13 is advanced past the same pickup heads by machine 21 to produce a 20 *c.p.s.* control signal. Such 20 c.p.s. control signal is impressed on earphones 28 and filter network 33, both of which are coupled to the output of the tape playback machine 21. As has been mentioned previously, to initiate the testing operation, switches 22 and 23 are closed. Closure of switch 23 connects the source of alternating current 26 to transformer 29 to supply current to a conventional power supply 31 having a direct current output to condition relay-amplifier 27 for operation.

The control signal, since it is of an inaudible frequency such as 20 c.p.s., will not be heard by the operator through earphones 28. However, the filter network 33 passes only the 20 c.p.s. control signal. From the low-pass filter 33 the 20 c.p.s. signal is directed to an amplifying common emitter transistor 34 where the amplitude of the 20 c.p.s. control signal is increased. From the transistor 34, the amplified 20 c.p.s. control signal is impressed on a diode rectifier 36 where a direct current output is produced. Such direct current from diode 36 is then applied to a direct current amplifying transistor 37 where the magnitude of the direct current signal is increased. From the transistor 37 the amplified direct current signal is conducted to a sensitive relay 40 connected in the collector circuit of transistor 37. In brief, when the 20 c.p.s. control signal 14 on magnetic tape 13 passes the pickup heads of machine 21, a direct current signal is produced to energize relay 40.

Figure 3:
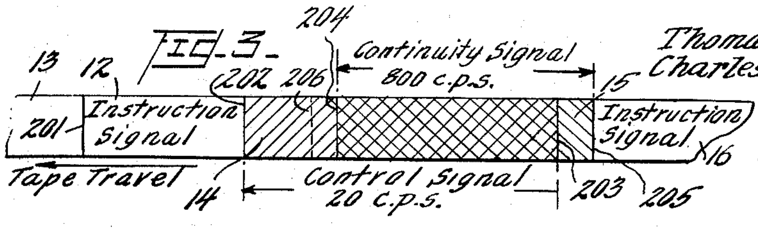
FIG. 3 illustrates a magnetic tape having an instruction signal, a control signal, and a continuity signal successively recorded thereon and corresponding to each testing step or operation of a sequence of testing steps or operations.

Energization of relay 40 closes contacts 41, connecting the alternating current source 26 to relay 50, thus energizing such relay 50. Energization of relay 50 closes contacts 51 and moves contactor 52 downwardly. Closure of contacts 51 connects the source of alternating current 26 to energize stop relay 60 through now closed contacts 51 and normally closed contacts 71 of unoperated relay 70. Stop relay 60 opens normally closed contacts 61 and closes normally open locking contacts 62. Locking contacts 62 maintain stop relay 60 energized until contacts 91, 101, and 71 are all opened. The opening of contacts 61 disconnects the source of alternating current 24 from the tape playback machine 21. Thus, machine 21 is deenergized to stop the advancement of tape 13. The nominal or average time which it takes to stop machine 21 when the 20 c.p.s. control signal 14 is produced by machine 21 is defined by lines 202 and 206 in FIG. 3. Also, a buffer zone, defined by lines 206 and 204, FIG. 3, is recorded on tape 13 to accommodate any variations that there may be in the nominal stopping interval.

While the tape playback machine 21 is deenergized, the operator performs the just previously heard testing instruction corresponding to instruction signal 12.

To illustrate the operation of this system for audibly instructing an operator in sequentially testing an electrical unit, an example of a particular testing instruction will be considered. Assume, for example, that the instruction signal 12 on tape 13 orally instructs the operator to position probes 111 and 112 selectively on unit 11 to be tested, such unit 11 having six rows of terminals designated 1 to 6, inclusive, and three columns of terminals designated *a*, *b*, and *c*, respectively. More particularly, assume that instruction signal 12 orally instructs the operator to place probe 111 on the terminal in column *a*, row 2, and probe 112 on the terminal in column *c*, row 5, to test the continuity between these terminals and to determine whether there is a ground connection on these terminals. While the tape playback machine 21 is deenergized, the operator positions these probes 111 and 112 in accordance with the just previously heard instruction signal 12.

If there is no continuity between the terminals of unit 11 being tested, there is an open circuit between probes 111 and 112 positioned on such terminals. Consequently, relay 70 remains deenergized since the circuit of probes 111 and 112 is open and resistors 113 and 114 offer too much resistance to permit current flow from battery 116 to energize relay 70. Thus contacts 71 remain in their normally closed condition and stop relay 60 remains energized or operated since normally closed contacts 71 and previously closed locking contacts 62 maintain the source of alternating current 26 connected to such relay 60. Thus contacts 61 of stop relay 60 remain open to maintain the tape playback machine 21 deenergized, thereby apprising the operator of the lack of continuity between the terminal in row 2, column *a*, and that in row 5, column *c*.

Moreover, if in addition to the lack of continuity, there is a ground connection on either the terminal in row 2, column *a*, or the terminal in row 5, column *c*, a circuit will be completed through either of probes 111 or 112 and either of resistors 113 or 114, through battery 117, relay 100, and bell 118 to ground 119. Completion of this circuit energizes bell 118 to apprise the operator of the ground connection on one of the terminals. Also, relay 100 is energized to close normally open contacts 101. However, closure of contacts 101 has no effect since it is in parallel with normally closed contacts 71 which are already closed since relay 70 is deenergized due to the open circuit between probes 111 and 112. Hence, it is apparent that either lack of continuity or a ground, or both, maintain the tape machine 21 deenergized.

On the other hand, if there is continuity between the terminal in row 2, column *a*, and the terminal in row 5, column *c*, battery 116 will be connected to relay 70 to energize it, opening contacts 71 and closing contacts 72 and 73. The opening of contacts 71 deenergizes stop relay 60 by opening the locking circuit formed by contacts 62 and 71. The deenergization of relay 60 closes contact 61 to reconnect the source of alternating current 24 to energize the tape playback machine 21. Energization of machine 21 again advances tape 13 in the direction of tape travel noted in FIG. 3.

At this point the zone defined by lines 202 and 204, FIG. 3, is positioned between the pickup heads. Consequently, on readvancement of tape 13, the 20 c.p.s. control signal is again produced at the output of tape machine 21 to again operate relay 40 and reclose contacts 41 to reenergize relay 50 to again close contacts 51 and move contactor 52 downwardly out of engagement with contact 53 and into engagement with contact 54. Closure of contacts 51 does not energize stop relay 60 because contacts 71 are now open due to the energization of relay 70 caused by continuity between the terminal in row 2, column *a*, and the terminal in row 5, column *c*, of unit 11. Since stop relay 60 is not energized, the tape playback machine 21 will continue to advance tape 13.

Since there is continuity between the terminals in row 2, column *a*, and in row 5, column *c*, and the operator keeps the probes in contact with these terminals, tape playback machine 21 remains energized to advance tape 13. As tape 13 advances, the back edge of the buffer zone and front edge of the 800 c.p.s. continuity signal defined by line 204, FIG. 3, moves past the pickup heads. Thus, an 800 c.p.s. continuity signal appears at the output of machine 21 and is heard by the operator through earphones 28, letting him know that there is continuity between the terminals in row 2, column *a*, and row 5, column *c*.

Furthermore, if in addition to continuity there is a ground connection on either the terminal in row 2, column *a*, or the terminal in row 5, column *c*, a circuit will be completed through either of the probes 111 or 112 and either of the resistors 113 or 114 through battery 117, relay 100 and bell 118 to ground 119. Completion of this circuit energizes bell 118 to apprise the operator of the ground connection on one of the terminals. Also relay 100 is energized to close normally open contacts 101. Closure of contacts 101 connects the source of alternating current 26 to stop relay 60 through now closed contacts 51 (such closure was caused by the operation of relays 40 and 50 due to the production of the 20 c.p.s. control signal) and now closed contacts 101 of now operated relay 100. Connection of the source of alternating current 26 to stop relay 60 energizes such relay 60 to open normally closed contacts 61 to deenergize tape machine 21. Hence, it is apparent that although there is continuity, if there is a ground, machine 21 is deenergized.

Since it is desirable that the tape playback machine 21 is deenergized at the onset of the succeeding 20 c.p.s. control signal even though the operator maintains continuity between probes 111 and 112, relays 80 and 90 are provided. In other words, these relays 80 and 90 insure correct control by stopping tape playback machine 21 at the onset of the next 20 c.p.s. control signal regardless of the operator's timing in removing the probes 111 and 112 from unit 11 under test. Thus, the operator is enabled to pace the tape playback machine 21; that is, the machine 21 does not force the operator to perform tests at a reckless rate.

Since the 20 c.p.s. control signal is still present when the front edge of the 800 c.p.s. control signal 15, defined by line 204, moves past the pickup heads, relays 40 and 50 remain energized or operated and contactor 52 remains downwardly in engagement with contact 54. Such engagement of contactor 52 with contact 54 energizes relay 80 through contactor 52, and contact 54, and now closed contacts 73 of now operated relay 70 (caused by continuity between probes 111 and 112). Energization of relay 80 closes contacts 81 and 82. Closure of contacts 82 establishes a locking circuit for relay 80 through now closed contacts 82 and now closed contacts 73 of now operated relay 70. Energization of relay 80 also closes contacts 81, but such closure is now ineffective since contactor 52 is now in engagement with contact 54 due to the production of the 20 c.p.s. signal and consequent operation of relays 40 and 50 while the pickup heads are in the area defined by lines 204 and 203.

Since the tape machine 21 is still energized, tape 13 continues to advance in the direction of travel shown in FIG. 3 and the 800 c.p.s. continuity signal 15 is heard by the operator. As the tape 13 continues to be advanced, the back edge of the 20 c.p.s. control signal defined by line 203 passes the pickup heads. At this time the 800 c.p.s. continuity signal is still heard by the operator. However, relays 40 and 50 are deenergized to open contacts 51 and move upwardly contactor 52 out of engagement with contact 54 and into engagement with contact 53. Upward movement of contactor 52 does not deenergize relay 80 due to its locking circuit through now closed contacts 82 and 73, but upward movement of contactor 52 energizes relay 90 through now upwardly moved contactor 52, contact 53, and now closed contacts 81. Energization of relay 90 closes contacts 92 to establish a locking circuit for this relay 90 through now closed contacts 92 and 72. Energization of relay 90 also closes contacts 91. Due to the locking circuit of relay 90, this relay 90 remains energized keeping contacts 91 closed. If the operator keeps the circuit of probes 111 and 112 closed, that is, maintains relay 70 operated until the succeeding 20 c.p.s. control signal (following the instruction signal 16 and not shown) appears at the pickup heads of machine 21, relay 40 operates to energize relay 50 to close contacts 51. Since contacts 91 have been maintained closed by the continued operation of relays 70 and 90 and contacts 51 are now closed, the alternating current source 26 is connected to energize stop relay 60. Energization of stop relay 60 opens contacts 61 to disconnect the alternating current source 24 from the tape playback machine 21 thereby deenergizing machine 21 to discontinue the advancement of tape 13 past the pickup heads. Thus, it is apparent that the tape playback machine 21 is deenergized at the next of the succeeding 20 c.p.s. control signal so as not to force the operator's pace.

It should be understood that the above-described embodiment of the invention is merely illustrative and that numerous modifications may be made within the spirit and scope of the invention. Further, the particular apparatus illustrated is only one example of several types of apparatus which may be included in practicing the invention and the invention is not limited solely to the use of this apparatus.

What is claimed is:

1. In an apparatus for instructing a human operator to make a plurality of electrical continuity tests between selected terminals of a unit;

a magnetic tape having a plurality of recurring audible instruction signals, inaudible control signals and audible continuity indicating signals successively recorded thereon;

a tape playback machine for transposing said recorded signals into electrical signals;

a power supply means connected to said machine for energizing said machine to generate the signals;

means for rendering only said audible electrical signals intelligible to a human operator;

means responsive to said inaudible electrical control signals for interrupting said power supply means to deenergize said machine;

circuit means having a pair of probes for connection by the operator to selected terminals of the unit under test in accordance with said audible instruction signals; and means actuated by the connection of said probes to said terminals and only responsive to a closed circuit between said probes for rendering effective said power supply means to reenergize said machine to produce said audible continuity indicating signals to indicate to the operator that the terminals tested are acceptable.

2. In an apparatus for instructing a human operator to make a plurality of continuity tests between selected terminals of a unit and electrical short tests between the terminals and a ground;

a magnetic tape having a plurality of recurring audible instruction signals, inaudible control signals, and audible continuity indicating signals successively recorded thereon;

a tape playback machine for transposing said recorded signals into electrical signals;

a power supply means connected to said machine for energizing said machine to generate the signals;

means for rendering only said audible electrical signals intelligible to a human operator;

means responsive only to said inaudible electrical control signals for interrupting said power supply means to deenergize said machine;

circuit means having a pair of probes for connection by the operator to selected terminals of the unit under test in accordance with said audible instruction signals;

first means actuated by the connection of said probes to said terminals and responsive to a short of said terminals to said ground for maintaining said power supply means interrupted and said machine deenergized; and second means actuated by the connection of said probes to said terminals and only responsive to a closed circuit between said probes for rendering effective said power supply means to reenergize said machine to produce said audible continuity indicating signals to indicate to the operator that the terminals tested are acceptable.

References Cited by the Examiner

UNITED STATES PATENTS

| | | | |
|---|---|---|---|
| 2,329,491 | 9/1943 | Sulzer | 324—73 |
| 2,849,677 | 8/1958 | Hannon | 324—73 |
| 2,851,660 | 9/1958 | Tobin et al. | 324—73 |
| 2,894,449 | 7/1959 | Boyden et al. | |
| 2,965,720 | 12/1960 | Bumstead et al. | 179—100.1 |
| 2,977,535 | 3/1961 | O'Connor et al. | 324—73 |
| 2,996,666 | 8/1961 | Baker | 324—73 |
| 3,059,062 | 10/1962 | Ojala | 179—100.1 |

WALTER L. CARLSON, *Primary Examiner.*

LLOYD McCOLLUM, RUDOLPH V. ROLINEC, *Examiners.*